United States Patent
O'Toole et al.

(10) Patent No.: US 10,521,773 B1
(45) Date of Patent: Dec. 31, 2019

(54) METHODS, COMPUTER PROGRAM PRODUCTS, AND SYSTEMS FOR REDUCING LIABILITY EXPOSURE BY IMPROVING RETIREMENT READINESS OF A WORKFORCE

(71) Applicant: Massachusetts Mutual Life Insurance Company, Springfield, MA (US)

(72) Inventors: Hugh O'Toole, Madison, CT (US); Drew E. Murphy, Mechanicsburg, PA (US)

(73) Assignee: Massachusetts Mututal Life Insurance Company, Springfield, MA (US)

( * ) Notice: Subject to any disclaimer, the term of this patent is extended or adjusted under 35 U.S.C. 154(b) by 746 days.

(21) Appl. No.: 15/159,191

(22) Filed: May 19, 2016

Related U.S. Application Data

(60) Provisional application No. 62/166,997, filed on May 27, 2015.

(51) Int. Cl.
*G06Q 10/10* (2012.01)

(52) U.S. Cl.
CPC ................ *G06Q 10/1057* (2013.01)

(58) Field of Classification Search
CPC .................................. G06Q 10/1057
USPC .............................................. 705/4
See application file for complete search history.

(56) References Cited

U.S. PATENT DOCUMENTS

| | | | | |
|---|---|---|---|---|
| 2007/0038542 A1* | 2/2007 | Armstrong | ............. | G06Q 40/02 705/36 R |
| 2007/0250427 A1* | 10/2007 | Robinson | ............... | G06Q 40/00 705/36 R |
| 2008/0133279 A1* | 6/2008 | Pollock | .................. | G06Q 40/08 705/4 |
| 2009/0171831 A1* | 7/2009 | Johnson, Jr. | ........... | G06Q 30/08 705/37 |
| 2011/0246393 A1* | 10/2011 | Wagner | .................. | G06Q 40/00 705/36 R |
| 2014/0058976 A1* | 2/2014 | Goodrich | ............... | G06Q 40/06 705/36 R |
| 2015/0262307 A1* | 9/2015 | Krueger | ................. | G06Q 40/06 705/36 R |
| 2016/0189106 A1* | 6/2016 | Fraungruber | ...... | G06Q 10/1057 705/7.22 |

(Continued)

OTHER PUBLICATIONS

"Stout, R Gene, Stochastic optimization of retirement portfolio asset allocation and withdrawals, 2008, Financial Services Review, 1-15" (Year: 2008).*

(Continued)

*Primary Examiner* — Eric T Wong
*Assistant Examiner* — Kevin T Poe
(74) *Attorney, Agent, or Firm* — Eric L. Sophir; Dentons US LLP

(57) ABSTRACT

Disclosed herein are methods, computer program products, and systems to generate graphical user interfaces displays on user devices to analyze the effects of costs associated with an aging workforce that is not adequately ready for retirement. These systems will also generate graphical user interfaces displaying the total present value liability of retirement plans over a plan time period, that takes into account retirement savings options, healthcare plan options, target retirement ages, a retirement age ranges, and a replacement age ranges.

11 Claims, 29 Drawing Sheets

(56) References Cited

U.S. PATENT DOCUMENTS

2016/0247228 A1* 8/2016 Connolly .............. G06Q 40/06
2017/0278192 A1* 9/2017 Peard .................... G06Q 40/06

OTHER PUBLICATIONS

Winklevoss, Howard E, Plasm: Pension Liability and Asset Simulation Model, May 1982, American Finance Association, vol. 37 No. 2 (Year: 1982).*

* cited by examiner

FIG. 4

Average age: 43.7

| Age Band (Yrs Old) | Number of Employees | Total Healthcare Costs | Average Healthcare Costs | Average Income |
|---|---|---|---|---|
| Age <25 | 39 | $83,956 | $2,153 | $26,714 |
| Age 26-30 | 90 | $328,455 | $3,650 | $38,195 |
| Age 31-35 | 105 | $357,973 | $3,409 | $53,382 |
| Age 36-40 | 78 | $257,836 | $3,306 | $91,141 |
| Age 41-45 | 78 | $354,308 | $4,542 | $76,020 |
| Age 46-50 | 82 | $456,363 | $5,565 | $89,840 |
| Age 51-55 | 91 | $610,128 | $6,705 | $78,911 |
| Age 56-61 | 79 | $608,608 | $8,435 | $77,569 |
| Age 62-70 | 73 | $875,948 | $12,254 | $79,392 |
| Total | 715 | $3,933,575 | | |
| Weighted Average | | | $5,502 | $69,312 |

FIG. 5

Cost of Delayed Retirement per Employee

Average New Hire Employee Cost vs. Average Retirement Age Employee Cost

|  | Average New Hire Employee | Average Retire Age Employee | Marginal Difference |
|---|---|---|---|
| Wages | $68,026 | $79,392 | $11,367 |
| Healthcare Costs | $4,061 | $12,254 | $8,193 |
| Total | $72,087 | $91,646 | Marginal Cost Difference $19,559 |

FIG. 6

Retirement Health Index for Workforce

| RHI | 100 | 90 | 80 | 70 | 60 | ≤60 |
|---|---|---|---|---|---|---|
| % of Workforce | 26.9% | 7.1% | 29.8% | 7.1% | 8.1% | 21.1% |

FIG. 7

Estimated Percentage for Number of Employees Retiring Broken Down by
Retirement Health Index Value and Each Age at the STRA per 100 Employees at RHI Distribution Value

| Ret Age | 100 | 90 | 80 | 70 | 60 | ≤60 |
|---|---|---|---|---|---|---|
| 62 | 40 | 30 | 10 | 0 | | |
| 63 | 20 | 10 | 10 | 0 | | |
| 64 | 20 | 20 | 20 | 10 | 10 | |
| 65 | 20 | 20 | 20 | 10 | 10 | 15 |
| 66 | 0 | 10 | 10 | 10 | 10 | 10 |
| 67 | 0 | 10 | 10 | 30 | 20 | 15 |
| 68 | 0 | 0 | 10 | 20 | 20 | 15 |
| 69 | 0 | 0 | 10 | 10 | 20 | 20 |
| 70 | 0 | 0 | 0 | 10 | 10 | 25 |
| Total | 100 | 100 | 100 | 100 | 100 | 100 |

| Average Expected Retirement Age | 63.2 | 64 | 65.3 | 67.1 | 67.3 | 68.8 |

FIG. 8

For a single Year, Expected Number of Retirements at each Age in the Selected Retirement Age Band =
% of Workforce from Fig 6 x Est. Expected Retirement % from Fig 7 x Headcount

| Ret Age | Actual Headcount | 100 | 90 | 80 | 70 | 60 | <60 | Total Est. Number of Retirements |
|---|---|---|---|---|---|---|---|---|
| 62 | 12 | 1.2912 | 0.2556 | 0.3576 | 0 | 0 | 0 | 1.9044 |
| 63 | 9 | 0.4842 | 0.0639 | 0.2682 | 0 | 0 | 0 | 0.8163 |
| 64 | 6 | 0.3228 | 0.0852 | 0.3576 | 0.0426 | 0.0486 | 0 | 0.8568 |
| 65 | 7 | 0.3766 | 0.0994 | 0.4172 | 0.0497 | 0.0567 | 0.22155 | 1.22115 |
| 66 | 3 | 0 | 0.0213 | 0.0894 | 0.0213 | 0.0243 | 0.0633 | 0.2196 |
| 67 | 2 | 0 | 0.0142 | 0.0596 | 0.0426 | 0.0324 | 0.0633 | 0.2121 |
| 68 | 4 | 0 | 0 | 0.1192 | 0.0568 | 0.0648 | 0.1266 | 0.3674 |
| 69 | 2 | 0 | 0 | 0.0596 | 0.0142 | 0.0324 | 0.0844 | 0.1906 |
| 70 | 8 | 0 | 0 | 0 | 0.0568 | 0.0648 | 0.422 | 0.5436 |
| | 53.0 | 2.5 | 0.5 | 1.7 | 0.3 | 0.3 | 1.0 | 6.3 |

RHI

FIG. 9

For a single Year, the calculated Yearly Present Value Liability
Employer First year Cost of Delayed Retirement

|  | 2015 |
| --- | --- |
| Expected Retirements | 14 |
| Delayed Retirements | 59 |
| Retirement Age Employees | 73 |

| Age | Retired Employees | Delayed Retirement | Early Retirement Savings ($) | Delayed Retirement Costs ($) | Potential Liability ($) |
| --- | --- | --- | --- | --- | --- |
| 62 | 1.9 | 19.4 | 58,319 |  | (113,397) |
| 63 | 0.8 | 10.1 | 39,329 |  | (33,318) |
| 64 | 0.9 | 8.2 | 19,893 |  | (17,018) |
| 65 | 1.1 | 5.1 |  | 19,893 | 102,338 |
| 66 | 0.2 | 5.9 |  | 19,893 | 116,453 |
| 67 | 0.2 | 2.8 |  | 19,893 | 54,890 |
| 68 | 0.4 | 1.8 |  | 19,893 | 35,432 |
| 69 | 0.2 | 3.6 |  | 19,893 | 71,994 |
| 70 | 8 | 1.8 |  | 19,893 | 35,997 |
|  | 14 | 59 | Net Potential Liability |  | 253,369 |

FIG. 10

Total Present Value Liability for Selected Period of Time

| Year Number | Yearly Present Value Liability | 5 Year Present Value Liability |
|---|---|---|
| 1 | $ 253,369 | |
| 2 | $ 238,278 | |
| 3 | $ 374,921 | |
| 4 | $ 499,026 | |
| 5 | $ 383,960 | $ 1,749,554 |
| 6 | $ 583,167 | |
| 7 | $ 812,361 | |
| 8 | $ 788,652 | |
| 9 | $ 733,607 | |
| 10 | $ 694,418 | $ 3,612,204 |
| 11 | $ 848,952 | |
| 12 | $ 808,326 | |
| 13 | $ 673,418 | |
| 14 | $ 726,876 | |
| 15 | $ 720,169 | $ 3,777,742 |
| 16 | $ 678,565 | |
| 17 | $ 584,389 | |
| 18 | $ 568,014 | |
| 19 | $ 580,369 | |
| 20 | $ 596,199 | $ 3,007,535 |
| 21 | $ 619,712 | |
| 22 | $ 642,332 | |
| 23 | $ 703,608 | |
| 24 | $ 730,966 | |
| 25 | $ 790,508 | $ 3,487,125 |
| Total Present Value Liability (TPVL) | $ 15,634,161 | sum of all above |

FIG. 11

Change in Total Present Value Liability
Improved Readiness Outcomes on Potential Liability

| Years | Current 57% | Recommended 79% | Improvement |
|---|---|---|---|
| 2015-2019 | $1,749,554 | $1,313,488 | $436,066 |
| 2020-2024 | $3,612,204 | $2,904,147 | $708,057 |
| 2025-2029 | $3,777,742 | $3,120,540 | $657,202 |
| 2030-2034 | $3,007,535 | $2,360,842 | $646,694 |
| 2035-2039 | $3,487,125 | $2,679,996 | $807,129 |
| Present Value Liability | $15,634,161 | $12,379,012 | $3,255,149 |

FIG. 12

Employee Level Data Introduction

Client Provided Employee Level Data Introduction

| | |
|---|---|
| Date of Birth | XX/XX/XXXX |
| Annual Salary | $ XX,XXXX |
| 5 Year Salary | $ XX,XXXX |
| Healthcare Costs Annual Claims | $ XX,XXX |
| Healthcare Costs Annual Premium | $ XX,XXXX |
| Healthcare Costs 5 Year Premium | $ XX,XXXX |

FIG. 13

Client Age Banded Employee Healthcare and Wage Cost

| Age Band | Headcount | Estimated Average Age | Total Plan H/C Payments | Average Cost Age Band | Average Income | Average Total Cost |
|---|---|---|---|---|---|---|
| Age 19-22 | 15 | 20.5 | $ 19,095 | $ 1,273 | $ 34,042 | $ 35,315 |
| Age 23-24 | 24 | 23.5 | $ 28,536 | $ 1,189 | $ 43,365 | $ 44,554 |
| Age 25-29 | 90 | 27 | $ 248,220 | $ 2,758 | $ 51,987 | $ 54,745 |
| Age 30-34 | 105 | 32 | $ 272,475 | $ 2,595 | $ 61,564 | $ 64,159 |
| Age 35-39 | 78 | 37 | $ 177,060 | $ 2,270 | $ 68,743 | $ 71,013 |
| Age 40-44 | 78 | 42 | $ 254,436 | $ 3,262 | $ 76,991 | $ 80,253 |
| Age 45-49 | 82 | 47 | $ 322,506 | $ 3,933 | $ 76,867 | $ 80,800 |
| Age 50-54 | 87 | 52 | $ 428,823 | $ 4,929 | $ 74,126 | $ 79,055 |
| Age 55-59 | 91 | 57 | $ 496,769 | $ 5,459 | $ 64,865 | $ 70,324 |
| Age 60-64 | 79 | 62 | $ 669,367 | $ 8,473 | $ 69,376 | $ 77,849 |
| Age 65+ | 73 | 67 | $ 722,043 | $ 9,891 | $ 71,354 | $ 81,245 |
| Total | 802 | 43.7 | $ 3,639,330 | $ 4,538 | | |

FIG. 14

Marginal Cost of Delayed Retirement per Employee

| | Average Retirement Age Employee Cost vs. Average New Hire Cost | | |
|---|---|---|---|
| | Average New Hire | Average Retire Age | Marginal Difference |
| Wages | $60,675 | $64,537 | $3,862 |
| Healthcare Costs | $2,668 | $9,891 | $7,223 |
| | | | Marginal Cost Difference |
| Total | $63,343 | $74,428 | $11,084 |

FIG. 15

Retirement Plan Input Information

Retirement Plan Input Information

Contribution Rates by Employee

| Employee No. | Contribution Rate | Account Balance | Date |
|---|---|---|---|
| XXXXXXX | XX% | $ XX,XXX.XX | XX/XX/XXXX |
| XXXXXXX | XX% | $ XX,XXX.XX | XX/XX/XXXX |
| XXXXXXX | XX% | $ XX,XXX.XX | XX/XX/XXXX |

Employer Contribution Match Rate

XXX%    OF    XX%

FIG. 16

Impact of Retirement Health Index on Retirement Age

|  | Estimated Current | | | | | |
|---|---|---|---|---|---|---|
| Retirement Health Index | 100 | 90 | 80 | 70 | 60 | <60 |
| Average Expected Retirement Age | 63.2 | 64 | 65.3 | 67.1 | 67.3 | 68.8 |
| Modeled Percentage of Workforce | 10% | 20% | 10% | 10% | 10% | 40% |

| | |
|---|---|
| Average Retirement Health Index | 49 |
| Average Expected Retirement Age | 67.87 |

FIG. 17

Expected Retirement by Current Retirement Health Index for Retirement Age Employees

| Model Variables | |
|---|---|
| Number of employees at age 61 | 100 |
| 2015 Marginal Cost of Delay per Employee | $11,257 |
| Discount Rate | 9% |
| Weighted average retire age | 67.869 |
| Current Retirement Health Index | 49% |

| Retirement Age | Forecast % Retirement | Retained Employees | Marginal Cost vs Retirement at age 65 |
|---|---|---|---|
| 62 | 5% | 95 | $ (28,494) |
| 63 | 9.75% | 90.25 | $ (19,802) |
| 64 | 14.26% | 85.74 | $ (10,327) |
| 65 | 22.84% | 77.16 | |
| 66 | 30.55% | 69.45 | $ 10,327 |
| 67 | 37.50% | 62.5 | $ 19,802 |
| 68 | 43.75% | 56.25 | $ 28,495 |
| 69 | 49.37% | 50.63 | $ 36,469 |
| 70 | 100% | 0 | $ 43,785 |

FIG. 18

Employer Level Input Information

| Employer Level Input Information | | |
|---|---|---|
| Average New Hire Age Range | From Age<br>XX | To Age<br>XX |
| Average Retirement Age Range | From Age<br>XX | To Age<br>XX |
| Annual Healthcare Cost Inflation | XX% | |
| Annual Wage Cost Inflation | XX% | |
| Annual Average Employee Separation Rates | <25 | XX% |
| | 25-29 | XX% |
| | 30-34 | XX% |
| | 35-39 | XX% |
| | 40-44 | XX% |
| | 45-49 | XX% |
| | 50-54 | XX% |
| | 55-59 | XX% |
| | 60-61 | XX% |
| Annual Workforce Size Forecast | Constant | 0% |
| | Increase | XX% |
| | Decrease | XX% |

FIG. 19

Employee Pre-Retirement Separation Rate chart

| Age Band | Separation Rate | Retained Employees |
|---|---|---|
| Age <25 | 2% | 100 |
| Age 25-29 | 15% | 85 |
| Age 30-34 | 10% | 76.5 |
| Age 35-39 | 10% | 68.8 |
| Age 40-44 | 5% | 65.4 |
| Age 45-49 | 5% | 62.1 |
| Age 50-54 | 2% | 60.8 |
| Age 55-59 | 2% | 59.6 |
| Age 60-61 | 0 | 59.6 |

FIG. 20

Expected Retirement Forecast at Current Retirement Health Index

| Retirement Age Employees | | |
|---|---|---|
| Age | Retirement Percentage | Delayed Percentage |
| 61 |  | 100% |
| 62 | 5% | 95% |
| 63 | 4.75% | 90.25% |
| 64 | 4.51% | 85.74% |
| 65 | 8.57% | 77.16% |
| 66 | 7.72% | 69.45% |
| 67 | 6.94% | 62.50% |
| 68 | 6.25% | 56.25% |
| 69 | 5.63% | 50.63% |
| 70 | 50.63% |  |

FIG. 21

Forecasted Number of Total and Retirement Age Employees Incorporating Separation Rates, Expected Retirement Rates at Current Retirement Health Index without Prescriptive Solutions

| Year | 5 | 10 | 15 | 20 |
|---|---|---|---|---|
| Age | 2018 | 2023 | 2028 | 2033 |
| 21-25 | 227.8 | 246.88 | 253.34 | 250.37 |
| 26-30 | 633.18 | 737.23 | 781.67 | 785.03 |
| 31-35 | 766.16 | 909.12 | 988.09 | 1,009.73 |
| 36-40 | 913.93 | 1,036.83 | 1,134.04 | 1.173.38 |
| 41-45 | 1,260.60 | 1,319.24 | 1,147.61 | 1,476.52 |
| 46-50 | 1,606.38 | 1,618.24 | 1,692.60 | 1,755.62 |
| 51-55 | 1,650.01 | 1,480.96 | 1,462.43 | 1,502.08 |
| 56-60 | 1,806.47 | 1,542.01 | 1,385.85 | 1,355.81 |
| 61-65 | 1,674.43 | 1,552.61 | 1,381.87 | 1,280.58 |
| Age 65+ | 997.46 | 1,110.53 | 1,038.48 | 946.88 |
| Total Workforce | 11,536 | 11,536 | 11,536 | 11,536 |
| Retirement Age EE's | 2,046 | 2,042 | 1,868 | 1,715 |

FIG. 22

Present Value Forecasted Cost of Expected Retirement Dates of Retirement Age Employees

| Number of Retirement Age Employees | | | 100 | | | | |
|---|---|---|---|---|---|---|---|
| Estimated RHI % EE | 10% | 20% | 10% | 10% | 10% | 40% | Present Value |
| RHI Score | 100 | 90 | 80 | 70 | 60 | <60 | Cost by Age |
| Age | | | | | | | |
| 62 | $ (1,139,791) | $ (854,844) | $ (284,948) | - | - | - | $ (313,442) |
| 63 | $ (396,046) | $ (198,023) | $ (198,023) | - | - | - | $ (99,011) |
| 64 | $ (206,550) | $ (206,550) | $ (206,553) | $ (103,275) | $ (103,275) | | $ (103,275) |
| 65 | - | - | - | - | - | - | |
| 66 | - | $ 103,275 | $ 103,275 | $ 103,275 | $ 103,275 | $ 206,550 | $ 134,257 |
| 67 | - | $ 198,023 | $ 198,023 | $ 594,069 | $ 396,046 | $ 297,035 | $ 277,232 |
| 68 | - | - | $ 284,948 | $ 569,896 | $ 569,896 | $ 427,422 | $ 313,442 |
| 69 | - | - | $ 364,695 | $ 364,695 | $ 729,391 | $ 547,043 | $ 364,695 |
| 70 | - | - | - | $ 437,858 | $ 437,858 | $ 656,787 | $ 350,286 |
| PV (Exp Retire) | $ (1,742,388) | $ (958,119) | $ 261,420 | $ 1,966,518 | $ 2,133,191 | $ 2,134,837 | $ 924,185 |
| | | | Present Value Cost of Expected Retirement | | | | |

FIG. 23

Present Value Forecasted Cost of Expected Retirement Dates of Current Retirement Age Employees

| Number of Retirement Age Employees | | | 1,529 | | | | |
|---|---|---|---|---|---|---|---|
| Estimated RHI % EE | 10% | 20% | 10% | 10% | 10% | 40% | Present Value |
| RHI Score | 100 | 90 | 80 | 70 | 60 | <60 | Cost by Age |
| Age | | | | | | | |
| 62 | $ (17,427,410) | $ (13,070,557) | $ (4,356,852) | - | - | - | $ (4,792,537) |
| 63 | $ (6,055,548) | $ (3,027,774) | $ (3,027,774) | - | - | - | $ (1,513,886) |
| 64 | $ (3,158,157) | $ (3,158,157) | $ (3,158,157) | $ (1,579,078) | $ (1,579,078) | - | $ (1,579,078) |
| 65 | - | - | - | - | - | - | |
| 66 | - | $ 1,579,058 | $ 1,579,058 | $ 1,579,058 | $ 1,579,058 | $ 3,158,157 | $ 2,052,801 |
| 67 | - | $ 3,027,774 | $ 3,027,774 | $ 9,083,322 | $ 6,055,548 | $ 4,541,661 | $ 4,238,883 |
| 68 | - | - | $ 4,356,852 | $ 8,713,705 | $ 8,713,705 | $ 6,535,279 | $ 4,729,537 |
| 69 | - | - | $ 5,576,191 | $ 5,576,191 | $ 11,152,381 | $ 8,364,286 | $ 5,576,190 |
| 70 | - | - | - | $ 6,694,849 | $ 6,694,849 | $ 10,042,274 | $ 5,355,879 |
| PV (Exp Retire) | $ (26,641,115) | $ (14,649,656) | $ 3,997,092 | $ 30,068,047 | $ 32,616,463 | $ 32,641,657 | $14,130,790 |
| | | | Present Value Cost of Expected Retirement | | | | |

FIG. 24

Improved Impact of Retirement Health Index on Retirement Age

| Retirement Health Index | 100 | 90 | 80 | 70 | 60 | <60 |
|---|---|---|---|---|---|---|
| Average Expected Retirement Age | 63.2 | 64 | 65.3 | 67.1 | 67.3 | 68.8 |
| Modeled Percentage of Workforce | 20% | 30% | 10% | 10% | 10% | 20% |
| Weighted Average Retirement Health Index: | 68 | | | | | |
| Weighted Average Expected Retirement Age: | 66.39 | | | | | |
| Goal: | 100 | | | | | |

FIG. 25

Present Value Forcasted Dynamic Liability Cost for 100 Retirement Age Employees with Prescriptive Solutions Applied

| Number of Retirement Age Employees | | | 100 | | | | |
|---|---|---|---|---|---|---|---|
| Estimated RHI % EE | 20% | 30% | 10% | 10% | 10% | 20% | Present Value |
| RHI Score | 100 | 90 | 80 | 70 | 60 | <60 | Cost by Age |
| Age | | | | | | | |
| 62 | $ (1,139,791) | $ (854,844) | $ (284,948) | | | | $ (512,906) |
| 63 | $ (396,046) | $ (198,023) | $ (198,023) | | | | $ (158,418) |
| 64 | $ (206,550) | $ (198,023) | $ (198,023) | | | | $ (144,585) |
| 65 | - | - | - | - | - | - | - |
| 66 | - | $ 103,275 | $ 103,275 | $ 103,275 | $ 103,275 | $ 206,550 | $ 103,275 |
| 67 | - | $ 198,023 | $ 198,023 | $ 594,069 | $ 396,046 | $ 297,035 | $ 237,627 |
| 68 | - | - | $ 284,948 | $ 596,896 | $ 596,896 | $ 427,422 | $ 227,958 |
| 69 | - | - | $ 364,695 | $ 364,695 | $ 729,391 | $ 547,043 | $ 255,286 |
| 70 | - | - | - | $ 437,858 | $ 437,858 | $ 656,787 | $ 218,929 |
| Present Value of Exp. Retire | $ (1,742,388) | $ (958,119) | $ 261,420 | $ 1,966,518 | $ 2,133,191 | $ 2,134,837 | $ 227,167 |
| | | | Present Value Cost of Expected Retirement | | | | |

FIG. 26

Dynamic Liability Estimate 20 Year Forecast at Current Retirement Health Index

| Year (s) | 2015 | 2015-2019 | 2020-2024 | 2025-2029 | 2030-2034 |
|---|---|---|---|---|---|
| Number EE Retirement Age | 1,529 | 2,002 | 2,042 | 1,868 | 1,715 |
| Retirement Age % Workforce | 13.3% | 17.4% | 17.7% | 16.2% | 14.9% |
| Present Value of 5 Year Costs (in 1,000) | N/A | $ 32,255 | $ 373,244 | $ 31,911 | $ 25,290 |
| 2015 Dynamic Liabililty | | | | $ 12,670,418 | |
| Plan Retirement Health Index Level = 49 | | | | | |

FIG. 27

Forecasted Number and Percentage of Retirement Age Employees without Prescriptive Solutions

|  | Forecasted Headcount | | |
|---|---|---|---|
|  | 2014 | 2019 | 2024 |
| Pre-Retirement Age | 10,007 | 9,490 | 9,523 |
| Retirement Age | 1,529 | 2,046 | 2,013 |
| Retirement Age % of Workforce | 13.25% | 17.74% | 17.45% |

FIG. 28

Estimated Dynamic Liability 20 Year Forecasted Cost at Current Retirement Health Index with Prescriptive Solutions

| | | Five Year Intervals | | | |
|---|---|---|---|---|---|
| Year | 2015 | 2015-2019 | 2020-2024 | 2025-2029 | 2030-2034 |
| Number Retirement Age Employees | 1,529 | 1,709 | 1,627 | 1,461 | 1,358 |
| Retirement Age EE's Percentage Workforce | 12.70% | 14.80% | 14.10% | 12.70% | 11.80% |
| Present Value of 5 5 Year Costs | N/A | $ 25,813,000 | $ 25,863,000 | $ 20,799,000 | $ 16,764,000 |
| 2015 Dynamic Liability | | | | | $ 89,240,119 |
| Plan Relative Retirement Health Index Score | 68 | | | | |

FIG. 29

Present Value Forecasted Dynamic Liability Cost of Current Employees with Prescriptive Solutions Applied

| Number of Retirement Age Employees | | | | 1,529 | | | |
|---|---|---|---|---|---|---|---|
| Estimated | | | | | | | |
| RHI % EE | 20% | 30% | 10% | 10% | 10% | 20% | Present Value |
| RHI Score | 100 | 90 | 80 | 70 | 60 | <60 | by Age |
| Age | | | | | | | |
| 62 | $ (17,427,410) | $ (13,070,557) | $ (4,356,858) | - | - | - | $ (7,842,334) |
| 63 | $ (6,055,548) | $ (3,027,774) | $ (3,027,774) | - | - | - | $ (2,422,219) |
| 64 | $ (3,158,157) | $ (3,158,157) | $ (3,158,157) | $ (1,579,078) | $ (1,579,078) | - | - |
| 65 | - | - | - | - | - | - | - |
| 66 | - | $ 1,579,078 | $ 1,579,078 | $ 1,579,078 | $ 1,579,078 | $ 3,158,157 | $ 1,579,078 |
| 67 | - | $ 3,027,774 | $ 3,027,774 | $ 9,083,322 | $ 6,055,548 | $ 4,541,661 | $ 3,633,328 |
| 68 | - | - | $ 4,356,852 | $ 8,713,705 | $ 8,713,705 | $ 6,535,279 | $ 3,485,481 |
| 69 | - | - | $ 5,576,191 | $ 5,576,191 | $ 11,152,381 | $ 8,364,286 | $ 3,903,333 |
| 70 | - | - | - | $ 6,694,849 | $ 6,694,849 | $ 10,042,274 | $ 3,347,424 |
| Present Value of Expected Retire | $ (26,641,114) | $ (14,649,636) | $ 3,997,112 | $ 30,068,067 | $ 32,616,483 | $ 32,641,656 | $ 3,473,384 |
| | | | | Present Value Cost of Expected Retirement | | | $ 3,473,384 |

METHODS, COMPUTER PROGRAM PRODUCTS, AND SYSTEMS FOR REDUCING LIABILITY EXPOSURE BY IMPROVING RETIREMENT READINESS OF A WORKFORCE

CROSS-REFERENCE TO RELATED APPLICATION

This application claims the benefit of U.S. Provisional Patent Application Ser. No. 62/166,997, filed May 27, 2015, which is incorporated herein by reference in its entirety.

TECHNICAL FIELD

The subject matter disclosed herein relates generally to methods, computer program products, and computing systems to evaluate and reduce burden on resources.

BACKGROUND

Employers are continuously challenged to maximize profits and increase profitability as employer costs, such as health care costs, continue to rise. Especially with the seemingly endless rise in health care costs, employers are desperately searching for ways to cut costs associated with group health care plans and retirement plans (collectively, "Plans"). The employer's selection of its Plans usually seeks to obtain satisfactory insurance and retirement options and plans for its employees at a cost the employer can afford and is able, and willing, to pay. Accordingly, with some consideration to a plan's options, including co-pays, deductibles, caps, coverage limits, investment options, forecasted investment performance, etc., employers most commonly select Plans based on the lowest quoted cost for a selected "level" of coverage and options. Once a Plan is selected, while an employer may be satisfied to have made the decision knowing the impact of the accompanying costs on employer's bottom line profits, the flaws with the analysis and selection process are completely overlooked.

Although there are a variety of existing tools to assist employers and employees to analyze various employee benefit financial situations, these are all limited in nature, do not integrate with each other, fail to consider critical criteria and therefore offer only a glimpse of the overall problem. They provide only a partial solution at best to all parties involved. Existing technologies do not consider, analyze, or calculate the present value of the future cost to the employer for an aging workforce that is unable to retire at a predetermined target age due to insufficient finances. Existing technologies do not seek to reduce the employer's costs for its employees by increasing the likelihood that the employee can retire at a predetermined target age. For instance, retirement planning companies typically make available, at an employee level, a computer program to assist in calculating the contribution level necessary to meet certain retirement income goals. Although this is of some help, it does not provide a complete financial picture for the employee. The complete analysis needs to also address a plethora of other considerations such as healthcare protection, debt management, tax efficiency, other risks such as disability and death, proper investment strategies, to mention only a few. But most significantly, these tools fail to integrate in any way with the concurrent needs of the employer, relative to cost and financial viability and how the employee and employer needs can be properly aligned to bring a mutually successful solution.

Conversely employers can independently calculate the costs of employee benefits such as healthcare and retirement plans separately utilizing spreadsheet programs or based upon reports from their providers for these services. However, again these are not integrated with the employee's needs and, more importantly, they do not identify the future financial impact of the selected current healthcare and retirement plans. The analysis fails to forecast or consider the consequences of the selection. The analysis fails to forecast or consider the impact on the employer arising from a financially unhealthy and/or aging workforce that is unable to retire, such as, increased healthcare claims and cost, higher healthcare and workers compensation premiums, and decreased annual productivity. Existing tools do not determine the cost variance on an employee age and retirement readiness related basis for the employer. So while the employer knows his total costs for the plans and services, the employer lacks a quantitative analysis on the impact of an aging workforce caused by a lack of retirement readiness and also lacks the detailed components costs of the total integrated view of expense. No prescriptive solutions are provided on how to best proceed in the future to mitigate the age related higher employee costs, to lower the corporate costs of the benefits, and at the same time improve the financial wellness of employees.

Existing technologies in this area are generally single benefit plan focused, on either employer or employee, without addressing the continuum of considerations necessary to bring about effective solutions for both the employer and employee. There is no related art providing a properly aligned analysis and prescriptive solution for both employee and employer.

There is a need for a new and better process and method to select Plans. There is a need for a process, method and system that considers the impact on the employer arising from an aging workforce unable to retire, such as increased healthcare claims and cost, higher healthcare and workers compensation premiums, decreased annual productivity, etc., and helps select a plan that reduces the impact. There is a need for a process, method and system that determines the cost variance on an employee age and retirement readiness related basis and quantitatively analyses the impact of an aging workforce caused by a lack of retirement readiness. There is a need for a process, method and system that determines the employer's future costs for Plans for a workforce (using predetermined parameters) and calculates/quantifies the differences (savings) in those future costs by increasing the retirement readiness of the workforce through Plan selections. There is a need for a process, method and system that reduces an employer's future costs for Plans based on the analysis of the long term reduced cost for the Plans arising from the selection of plans causing an increase in the workforce's ability to retire at a predetermined target age.

SUMMARY

Disclosed herein are methods, computer program products, and systems for decreasing an employer's long term financial liability for its workforce by selecting employer retirement plans that cause employees to save better for retirement eventually making them more ready to retire at a predetermined target age thus resulting in their retirement when they reach the predetermined target age or ages. Embodiments disclosed herein may include methods, computer program products, and systems to evaluate and reduce burden on resources with regards to employee benefit costs and retirement costs. Certain embodiments may include methods and systems used to generate cost models of employee benefit and retirement packages based on evolving demographics of the workforce. Some of the demographic inputs include date of birth, date of hire, income, account balance and deferral levels, and participation in benefits and retirement programs. These computer-generated models can display improvements of an employer's long term profitability when employee benefits and retirement plans and packages are selected to improve and enhance the financial well-being of employees, such as enabling them to retire at a target age (e.g., 65 years old). More specifically, certain methods, computer program products, and systems are disclosed herein for decreasing an employer's long term financial liability for its workforce by selecting employer retirement plans that cause employees to save better for retirement eventually making them more ready to retire at a predetermined target age.

While the subject matter disclosed herein may be described in connection with certain embodiments, it will be understood that the subject matter disclosed herein is not limited to those embodiments. To the contrary, the subject matter disclosed herein includes all alternatives, modifications and equivalents as may be included within the spirit and scope of the present subject matter disclosed herein.

In an embodiment, a computer-implemented method for generating a graphical user interface on a client device comprises receiving, by an analytical engine executed by one or more server computers, from a client device a plurality of selected values corresponding to a plurality of parameters affecting a retirement plan and a request to display a total present value liability of the retirement plan over a plan time period, wherein the plurality of selected parameters include a retirement savings option, a healthcare plan option, a target retirement age, a retirement age range, and a replacement age range; querying, by the analytical engine, an employment database containing a first plurality of data records to identify a second plurality of data records in response to the selected values for the retirement age range and a third plurality of data records in response to the selected values for the replacement age range, the first plurality of data records comprising employee data records and new hire data records, wherein the employee data records contain information associated with substantially all employees associated with the retirement plan, and the new hire data records contain information associated with new employees to be hired to maintain a workforce, the second plurality of data records comprising employee data records containing values for employee age within the selected values for the retirement age range and higher than the selected value for the target retirement age during a first year in the plan time period, and the third plurality of data records comprising new hire data records containing values for employee age within the selected values for the replacement age range; determining, by the analytical engine, an annual present value liability based on a first annual cost value determined based on the second plurality of data records and a second annual cost value determined based on the third plurality of data records, wherein the analytical engine stores the determined annual present value liability for one or more years indicated by the plan time period; and upon a selection in a graphical user interface displayed on client device, generating, by the analytical engine, a new graphical user interface configured to display at the client device a total present value liability of the retirement plan, based on the stored determined annual present value liability generated for each respective year in the plan time period.

In another embodiment, a computer-implemented method for generating a graphical user interface on a client device comprises receiving, by an analytical engine executed by one or more server computers, from a client device a plurality of selected values corresponding to a plurality of parameters affecting a retirement plan and a request to display a total present value liability of the retirement plan over a plan time period, wherein the plurality of selected parameters include a retirement savings option, a healthcare plan option, a target retirement age, a retirement age range, and a replacement age range; querying, by the analytical engine, an employment database containing a first plurality of data records to identify a second plurality of data records in response to the selected values for the retirement age range and a third plurality of data records in response to the selected values for the replacement age range, the first plurality of data records comprising a plurality of employee data records and a plurality of new hire data records, wherein the employee data records contain information associated with substantially all employees associated with the retirement plan, and the new hire data records contain information associated with new employees to be hired to maintain a workforce, the second plurality of data records comprising employee data records containing values for employee age within the selected values for the retirement age range, and the third plurality of data records comprising new hire data records containing values for employee age within the selected values for the replacement age range; determining, by the analytical engine, a plurality of retirement readiness scores based on a plurality of data records from the employment database, the second plurality of data records, and the target retirement age, wherein each of the plurality of the retirement readiness scores is associated with a data record of the second plurality of data records, and wherein the employer database contains data records associated with current and historical retirement plans, retirement savings options, and healthcare plan options; generating, by the analytical engine, a plurality of retirement readiness index levels by grouping into a retirement readiness index level two or more data records of the second plurality of data records having comparable retirement readiness scores; retrieving, by the analytical engine, from the employment database a predetermined estimate of the percentage of employees who will not retire in each of the plurality of retirement readiness index levels; applying, by the analytical engine, the predetermined estimate to the second plurality of data records in the same retirement readiness index level to identify a fourth plurality of data records associated with employees who will not retire at the target retirement age and containing values for employee age higher than the selected value for the target retirement age during a first year in the plan time period; applying, by the analytical engine, the predetermined estimate to the second plurality of data records in the same retirement readiness index level to identify a fifth plurality of data records containing values for employee age lower than the selected value for the target retirement age during a first year in the plan time period; determining, by the analytical engine, an annual present value liability based on a first annual cost value calculated based on the third plurality of data records, a second annual cost value calculated based on the fourth plurality of data records, and a third annual cost value calculated based on the fifth plurality of data records; wherein the analytical engine determines the annual present value liability for each respective year in the plan time period; and upon determining that annual cost differences have been generated for each year in the plan time period:

generating, by the analytical engine, a graphical user interface configured to display at a client device a total present value liability of the retirement plan for each year in the plan time period.

In another embodiment, a system comprises at least one processor; an employment database communicatively coupled to the processor; and a non-transitory computer-readable storage medium having instructions stored therein, which when executed by a processor, cause the processor to: receive from a client device a plurality of selected values corresponding to a plurality of parameters affecting a retirement plan and a request to display a total present value liability of the retirement plan over a plan time period, wherein the plurality of selected parameters include a retirement savings option, a healthcare plan option, a target retirement age, a retirement age range, and a replacement age range; query an employment database containing a first plurality of data records to identify a second plurality of data records in response to the selected values for the retirement age range and a third plurality of data records in response to the selected values for the replacement age range, the first plurality of data records comprising employee data records and new hire data records, wherein the employee data records contain information associated with substantially all employees associated with the retirement plan, and the new hire data records contain information associated with new employees to be hired to maintain a workforce, the second plurality of data records comprising employee data records containing values for employee age within the selected values for the retirement age range and higher than the selected value for the target retirement age during a first year in the plan time period, and the third plurality of data records comprising new hire data records containing values for employee age within the selected values for the replacement age range; determine an annual present value liability based on a first annual cost value determined based on the second plurality of data records and a second annual cost value determined based on the third plurality of data records, wherein the processor determines the annual present value liability for each respective year in the plan time period; and generate and transmit to a client device a graphical user interface displaying a total present value liability of the retirement plan over the plan time period based upon the annual present value liability for each respective year in the plan time period.

In another embodiment, a system comprises at least one processor; an employment database communicatively coupled to the processor; and a non-transitory computer-readable storage medium having instructions stored therein, which when executed by a processor, cause the processor to: receive from a client device a plurality of selected values corresponding to a plurality of parameters affecting a retirement plan and a request to display a total present value liability of the retirement plan over a plan time period, wherein the plurality of selected parameters include a retirement savings option, a healthcare plan option, a target retirement age, a retirement age range, and a replacement age range; query an employment database containing a first plurality of data records to identify a second plurality of data records in response to the selected values for the retirement age range and a third plurality of data records in response to the selected values for the replacement age range, the first plurality of data records comprising a plurality of employee data records and a plurality of new hire data records, wherein the employee data records contain information associated with substantially all employees associated with the retirement plan, and the new hire data records contain information associated with new employees to be hired to maintain a workforce, the second plurality of data records comprising employee data records containing values for employee age within the selected values for the retirement age range, and the third plurality of data records comprising new hire data records containing values for employee age within the selected values for the replacement age range; determine a plurality of retirement readiness scores based on a plurality of information from the employment database, the second plurality of data records, and the target retirement age, wherein each of the plurality of the retirement readiness scores is associated with one of the second plurality of data records, and the employer database contains data records associated with current and historical retirement plans, retirement savings options, and healthcare plan options; generate a plurality of retirement readiness index levels by grouping two or more of the second plurality of data records with similar retirement readiness scores into a single retirement readiness index level; retrieve from the employment database a predetermined estimate of the percentage of employees who will not retire in each of the plurality of retirement readiness index levels; apply the predetermined estimate to the second plurality of data records in the same retirement readiness index level to identify a fourth plurality of data records associated with employees who will not retire at the target retirement age and containing values for employee age higher than the selected value for the target retirement age during a first year in the plan time period; apply the predetermined estimate to the second plurality of data records in the same retirement readiness index level to identify a fifth plurality of data records containing values for employee age lower than the selected value for the target retirement age during a first year in the plan time period; determine an annual present value liability based on a first annual cost value calculated based on the third plurality of data records, a second annual cost value calculated based on the fourth plurality of data records, and a third annual cost value calculated based on the fifth plurality of data records; wherein the processor determine the annual present value liability for each respective year in the plan time period; and upon determining that annual cost differences have been generated: generate and transmit to a client device a graphical user interface displaying a total present value liability of the retirement plan over the plan time period from each of the annual present value liability generated for each year in the plan time period.

BRIEF DESCRIPTION OF THE DRAWINGS

The accompanying drawings, which are incorporated in and constitute a part of this specification, illustrate embodiments of the subject matter disclosed herein and, together with the general description of the subject matter above and the detailed description of embodiments given below, serve to explain any number of underlying principles and provide any number of advantages.

FIG. 4 shows a table containing the workforce data collected for an exemplary workforce of about 715 employees grouped into five year age bands with the number of employees in each age band, the total healthcare cost for the employees in each age band, the calculated average health care cost for an employee in the age band, and the calculated average income for an employee in the age band, according to an embodiment.

FIG. 5 shows a table containing the calculated W+H for a retirement age employee and a new hire employee along with the calculated marginal difference between the two, according to an example.

FIG. 6 shows an table containing the RHI index for a Workforce by percentage for the total Workforce, according to an example.

FIG. 7 shows the estimated percentage for the number of employees expected to retire at each age within the STRA range for each Retirement Health Index Value, according to an example.

FIG. 8 shows, for a single calendar year, the calculated expected number of retirements at each age in the selected retirement age band broken down by RHI value, according to an example. The expected number of retirements is the product of the percentage of the workforce at the RHI value from FIG. 6 multiplied by the estimated expected retirement percentage from FIG. 7 multiplied by the actual headcount at that age.

FIG. 9 shows a table with the number of early retirees and delayed retirees for one specific calendar year for a specific preset or predetermined or selected plan period of time (e.g., 25 years), according to an example. Using the Cost Per Employee Not Retiring (a present value amount), the savings for each retiree below the STRA and the cost for each retiree above the STRA are calculated for each age in the retirement age band. The total savings and costs is the yearly present value liability.

FIG. 10 shows a table with the calculated results for the total present value liability, according to an example, to the employer for the entire preselected period of time for an example Workforce.

FIG. 11 is a table showing the impact on the employer's liability over the preselected period of time when the overall RHI for the entire Workforce is improved, through implementing measures, from 37% to 58%, according to an example.

FIG. 12 is an exemplary data screen for employee census data, healthcare costs and wage data, according to an example.

FIG. 13 is an exemplary data screen of client age-banded employee cost summary for wages and healthcare, according to an example.

FIG. 14 is an exemplary data screen of the marginal Cost of Delayed Retirement per Employee, according to an example.

FIG. 15 is an exemplary data screen of the retirement plan input information including contribution rates, employer match, account balances, according to an example.

FIG. 16 is an exemplary data screen of the impact of Retirement Health Index on retirement age, according to an example.

FIG. 17 is an exemplary data screen of the expected retirement model by current Retirement Health Index for retirement age employees, according to an example.

FIG. 18 is an exemplary data screen of client new hire age range, retirement age range, healthcare cost inflation, wage inflation, separation rates and workforce size assumptions, according to an example.

FIG. 19 is an exemplary data screen of employee pre-retirement separation rate demographics, according to an example.

FIG. 20 is an exemplary data screen of expected retirement forecast at current Retirement Health Index, according to an example.

FIG. 21 is an exemplary data screen of forecasted number of total and retirement age employees incorporating separation rates, expected retirement rates at current Retirement Health Index, according to an example.

FIG. 22 is an exemplary data screen of Present Value Forecasted Cost of expected retirement of retirement age employees, according to an example.

FIG. 23 is an exemplary data screen of Present Value Forecasted Cost of expected retirement of current retirement age employees, according to an example.

FIG. 24 is an exemplary data screen of improved impact of Retirement Health Index on retirement age, according to an example.

FIG. 25 is an exemplary data screen of the Present Value Forecasted Dynamic Liability Cost of 100 retirement age employees with prescriptive solutions applied, according to an example.

FIG. 26 is an exemplary data screen of Dynamic Liability Estimate 20-Year forecast at current Retirement Health Index, according to an example.

FIG. 27 is an exemplary data screen of forecasted number and percentage of retirement age employees without prescriptive solutions, according to an example.

FIG. 28 is an exemplary data screen of estimated Dynamic Liability 20-Year forecasted cost at current Retirement Health Index, according to an example.

FIG. 29 is an exemplary data screen of Present Value Forecasted Dynamic Liability Cost of current retire age employees with prescriptive solutions applied, according to an example.

DETAILED DESCRIPTION

Figure 1:
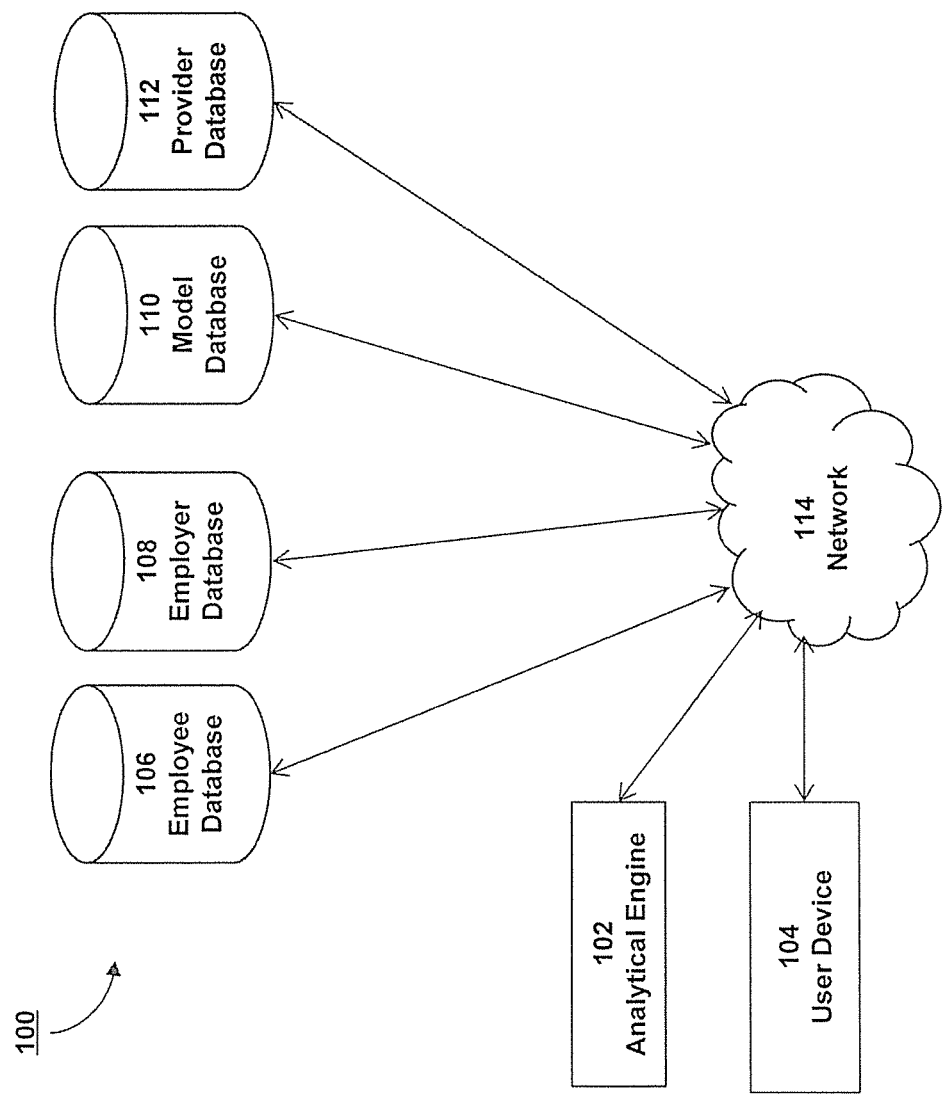
FIG. 1 is a block diagram illustrating a system including an analytical engine within a retirement health calculator system, according to an embodiment.

Reference will now be made to the exemplary embodiments illustrated in the drawings, and specific language will be used here to describe the same. It will nevertheless be understood that no limitation of the scope of the disclosure is thereby intended. Alterations and further modifications of the inventive features illustrated here, and additional applications of the underlying principles of potential embodiments, components, and operation as illustrated herein, which would occur to one skilled in the relevant art and having possession of this disclosure, are to be considered within the scope of the disclosure.

As employees age, they become more expensive to an employer due to healthcare costs, wage scales, risk management and productivity considerations. The root cause of an average workforce trending older is that many employees cannot afford to retire and therefore remain on the job longer. Certain embodiments may include computing systems and/or computer products that quantify the additional costs of this trending to the employer, and provides for the selection of changes to Plans that reduces these costs by enabling employees to become financially healthy and therefore retire "on time" and subsequently lower the average workforce age and cost.

"Analytical engine" refers to one or more software modules executed on one or more server computers that handle data integration, execute rules, and perform data matching by using fuzzy logic, and can include communication management and administration functionalities, among others.

The analytical engine can also include a software module, referred to herein as a retirement health calculator that executed various embodiments of the methods disclosed herein.

A "User device" can be any type of mobile computing device capable of executing the application programs and may be a smart phone, a tablet, or any mobile computing device having a network connection. The application program used by the client to access the retirement health system can include one requiring proper credentials, and graphical user interfaces that present, collect, and communicate information between the client devices and analytical engine. Proper credentials, such as client identifiers or employee identifiers, uniquely identify the particular computing device, the user of a computing device, the user of the application program on a computing device, or combinations thereof. The credentials can include alphanumeric strings (either case-sensitive or not), symbols, such as punctuations and mathematical symbols, images, and all combinations thereof.

FIG. 1 is a block diagram illustrating an exemplary retirement health calculator system 100 including an analytical engine 102 and a user device 104. One or more of the methods disclosed herein may be performed by one or more computing devices in the system described in 100. Each of the different components of the retirement health calculator system 100 may be implemented in any type of computer-based architecture including suitable processor-controlled devices that receive, process, and/or transmit digital data, configured as further described below and in FIG. 1. Examples of devices incorporating one or more suitable processor-controlled devices include smartphones, desktop computers, laptop computers, servers, tablets, PDAs, specialized computing platforms for Plan data processing, risk assessment algorithms, and the like. In FIG. 1, analytical engine 102 receives data from several databases, including but not limited to an employee database 106, an employer database 108, a model database 110, and a provider database 112. Each of these databases is communicatively coupled to analytical engine 102 via a network 114. In these embodiments, analytical engine 102 processes the request for data and analysis, and selection values from the user device 104 and stores the processed data at model database 110. In certain aspects, employee database 106, an employer database 108, a model database 110, and a provider database 112 can be a single entity, but may also include or be referred to as an "employment database," nested databases, and/or may otherwise include any number of interconnected databases. The analytical engine 102 can generate a graphical user interface at the user device to facilitate interaction with system 100 via one or more computing-networks 114. Graphical user interfaces include one or more displays presented on a computing device that enable a user interaction with the analytical engine 102 or other devices in the system 100, associated data acquisition, and processing functionalities. These interfaces can be implemented within an operating system, a discrete GUI software layer, an application program, or any combination thereof. The graphical user interfaces can also include hyperlinks or other selection mechanisms for allowing an input from a client device to select a link or input data or a command, e.g., selecting a hyperlink to generate a report.

In certain embodiments, analytical engine 102 can be implemented as software that runs on a server including a processing unit for running related algorithms or computer executable program instructions. The analytical engine 102 can be implemented using a single-processor system including one processor, or a multi-processor system including any number of suitable processors that may be employed to provide for parallel and/or sequential execution of one or more portions of the techniques described herein. Processes and logic flows described herein may be performed by one or more programmable processors executing one or more computer programs to perform functions by operating on input data and generating corresponding output. Processing unit may include a processor with computer-readable medium, such as a random access memory (RAM) (not shown) coupled to the processor. Examples of processor may include a microprocessor, application specific integrated circuit (ASIC), and field programmable object array (FPOA), among others.

In some embodiments, analytical engine 102 can be executed by a server, one or more server computers, a client computing device and the like. Examples of suitable implementations of the analytical engine 102 include servers, authorized client computing devices, smartphones, desktop computers, laptop computers, tablet computers, PDAs and other types of processor-controlled devices that receive, process, and/or transmit digital data. In an example, analytical engine 102 performs certain operations that are required for the proper operation of system architecture 100. Analytical engine 102 performs these operations as a result of central processing unit executing software instructions contained within a computer-readable medium, such as within memory. In one embodiment, the software instructions of the system are read into memory associated with the analytical engine 102 from another memory location, such as from storage device, or from another computing device via communication interface. In this embodiment, the software instructions contained within memory instruct the analytical engine 102 to perform processes that are described herein. Alternatively, hardwired circuitry may be used in place of or in combination with software instructions to implement the processes described herein. Thus, implementations described herein are not limited to any specific combinations of hardware circuitry and software.

The employee database 106 is a body of information associated with the employers and organized as data records. The employee database can comprise information from either external sources, internal sources, or both. In an embodiment, the employee database 106 and employer database 108 can be a single entity, or nested databases or otherwise interconnected databases, connected virtually or physically to other databases. Information in these databases can be stored or retrieved dynamically using appropriate storage management software. Information stored in a employee database 106 specific to a particular employee include demographic information such as age (date of birth), age of hire, and gender, current and historical financial information such as salary/income, account balances, employee percentage of compensation, deferral notes, employer percentage match rates for retirement plans, salary contribution, cap rates, and stock option plans, and also current and historical healthcare information such as health care plans, premium amounts paid, and amounts for claims paid. Information stored in a employer database 108 includes one or more of financials of the company, stock quotes, current and historical workforce information, job profiles, future workforce needs, and other corporate information required to determine the current, historical, and future financial assets and liabilities of the company. Information stored in a model database 110 includes one or more of retirement health models considered and analyzed, data supporting retirement health decisions, and other constants and variables required to perform the methods disclosed herein. Information stored in the provider database 112 includes one or more of current and historical retirement plans, retirement plan options, current and historical healthcare plans, healthcare plan options, and other Plan, employer, and workforce related-information. One or more client-side and server-side technologies or combinations thereof can be implemented to ensure that the graphical user interfaces are dynamically generated based on the updates to the records in one or more of the employment databases. Content for personalized web-based or an app-based interfaces can be dynamically generated on user devices. Data communicated between the various devices, servers, and other components of the system is encrypted, stored, decrypted, and distributed using one or more firewalls, antivirus and anti-phishing software, file encryption protocols, and other encryption software.

Different kinds of arrangements among user devices, servers with the analytical engine, and the various databases such as the employee database 106, the employer database 108, the model database 110, and the provider database 112 can be supported. It will be appreciated by those having skill in the art that data described herein as being stored in the databases can also be stored or maintained in non-transitory memory and accessed among subroutines, functions, modules, objects, program products, or processes, for example, according to objects and/or variables of such subroutines, functions, modules, objects, program products or processes. Non-transitory computer-readable media comprise all computer-readable media, with the sole exception being a transitory, propagating signal. Any of the fields of the records, tables, libraries, and so on of the database can be multi-dimensional structures resembling an array or matrix and can include values or references to other fields, records, tables, or libraries. Any of the foregoing fields can contain actual values or a link to other values, a join, a reference, or a pointer to other local or remote sources for such values. Databases can be, for example, a single database, multiple databases, or a virtual database, including data from multiple sources, for example, servers on the World Wide Web.

The network 114 may comprise any communication architecture, inclusive of devices and software, which facilitates communication between transmitter and receiver residing in one or more computing devices that form the system 100. It should also be obvious to one skilled in the art that the network components may be implemented in dedicated processing equipment, or alternatively in a cloud processing network. The network 308 may be the intranets, local area networks (LAN), cloud networks, virtual private networks (VPN), wireless area networks (WAN), and the internet, or any other network that enables servers and user devices to interact with one another. Non-limiting examples of devices comprising the network may include routers, switches, hubs, firewalls, proxy servers, telecommunications trunks, and the like. Accordingly, the communications network can be implemented, in whole or in part, over wireless communications network. In addition, according to various exemplary embodiments, the wireless communications network can be implemented over any of various wireless communication technologies, for example: code division multiplexed access ("CDMA"), global system for mobile communications ("GSM"), and wireless local area network such as WiFi, World Interoperability for Microwave Access ("WiMAX"), or Bluetooth®.

Figure 2:
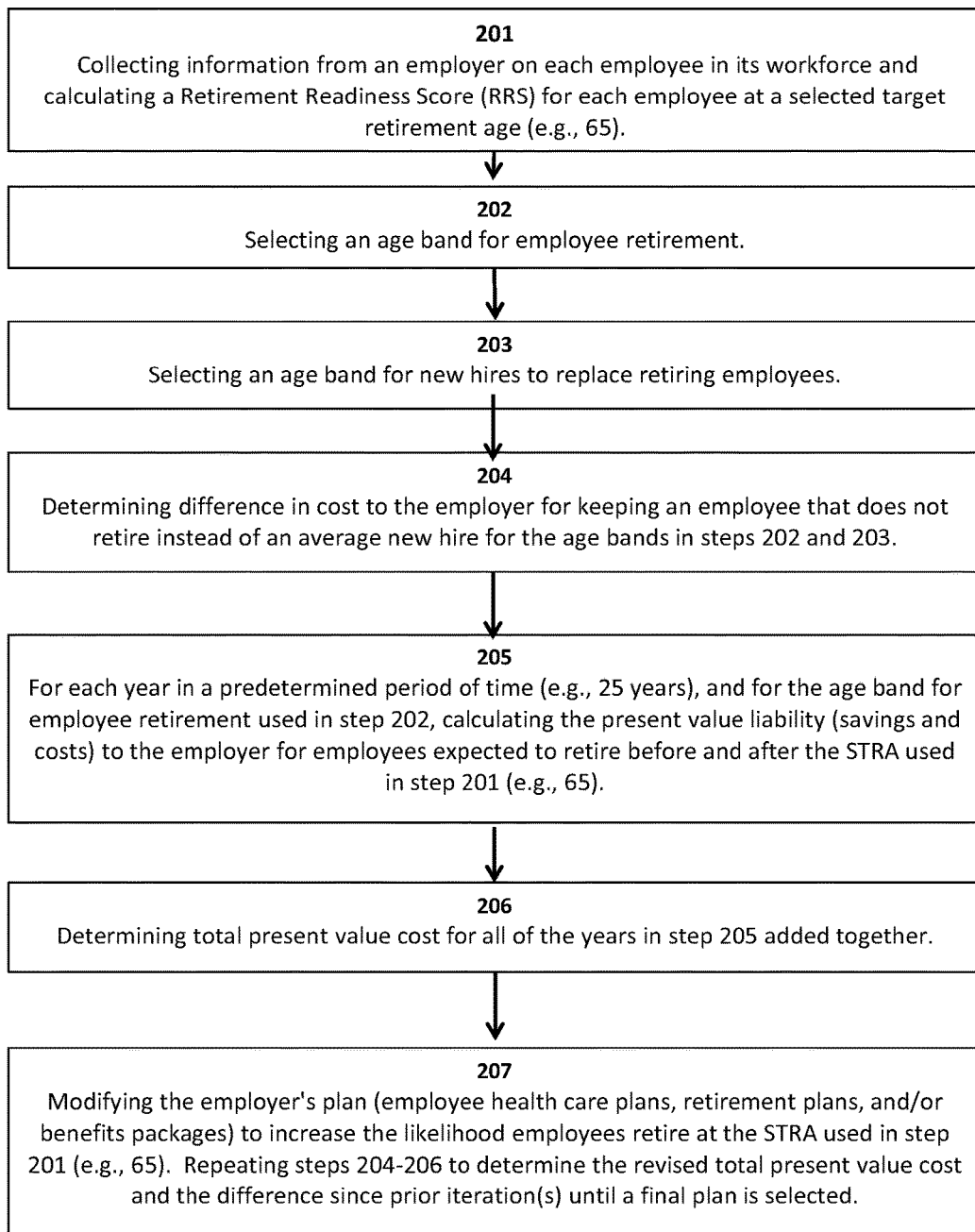
FIG. 2 is a process flow diagram of an exemplary method showing the determination of the present value liability to the employer for employees unlikely to be ready to retire at a preselected retirement age.
Figure 3:
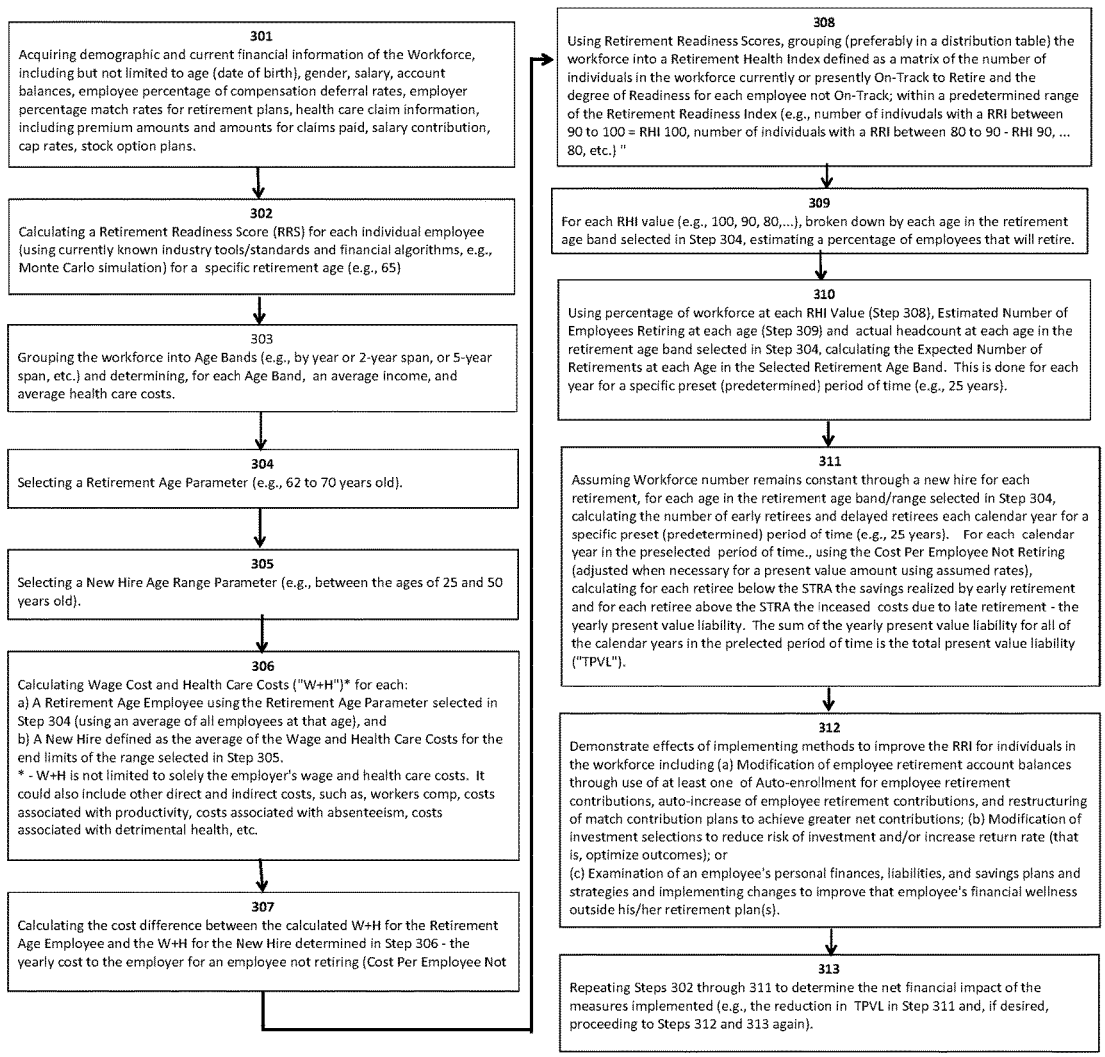
FIG. 3 is a process flow diagram of another exemplary method showing the determination of the present value liability to the employer for employees unlikely to be ready to retire at a preselected retirement age.

FIGS. 2 and 3 are process flow diagrams of an exemplary method. Both FIGS. 2 and 3 show the selection of employer Plans based on the determination of the total present value liability to the employer for employees likely and unlikely to be ready to retire at a preselected retirement age. The selection of the Plans is based on the resulting reduction in that total present value liability over the course of an preselected period of time (e.g., 25 years) when changes to Plans are made and the total present value liability for the time period is recalculated. Embodiments of the methods and systems disclosed herein help evaluate the future financial impact of the current healthcare and retirement plans. The methods and systems facilitate the forecast or consideration of the consequences of selection of certain healthcare and retirement plans. For example, the methods and systems generate graphical user interfaces that present the impact on the employer arising from a financially unhealthy and/or aging workforce that is unable to retire, such as, the impact of increased healthcare claims and cost, higher healthcare and workers compensation premiums, and decreased annual productivity.

The exemplary method described in FIG. 2 includes the step 201 of collecting information from an employer on each employee in its workforce and calculating a Retirement Readiness Score (RRS) for each employee at a selected retirement age (e.g., 65); step 202 of selecting an age band that employees are expected to retire between (e.g., 62 to 70 years old); step 203 of selecting an age band for new hires (e.g., 25 to 50 years old) to replace retiring employees; step 204 of determining the difference in cost to the employer for keeping an employee that does not retire instead of an average new hire for the age bands in steps 202 and 203. The method further includes the step 205, wherein for each year in a predetermined period of time (e.g., 25 years), and for the age band for employee retirement used in step 202, the yearly present value liability is calculated (savings and costs) to the employer for employees expected to retire before and after the predetermined age used in step 1 (e.g., 65); step 206 of determining the total present value liability as the total of all of the yearly present value liabilities in step 205 added together; and the step 207 of modifying the employer's plan (employee health care plans, retirement plans, and/or benefits packages) to increase the likelihood employees retire at the predetermined age used in step 201 (e.g., 65), and repeating steps 204-206 to determine the revised total present value liability and the difference since prior iteration(s) until a final plan is selected. The employer then implements the modified plan expecting to realize the calculated savings.

Embodiments disclosed herein include methods, computer program products, and systems to evaluate and reduce burden on resources with regards to employee benefit costs and retirement costs. Certain embodiments include methods and systems used to generate cost models of employee benefits and retirement programs based on evolving demographics of the workforce. Some of the demographic inputs include date birth, date of hire, income, account balance and deferral levels, and participation in benefits and retirement programs. The exemplary method described in FIG. 3 includes the step 301 of acquiring from an employer/employee databases, demographic and current financial information about the employer's workforce, including but not limited to age (date of birth), gender, salary/income, date of hire, account balances, employee percentage of compensation, deferral levels, employer percentage match rates for retirement plans, health care claim information, including premium amounts and amounts for claims paid, salary contribution, cap rates, stock option plans.

In step 302, using the collected workforce data, a Retirement Readiness Score (RRS) is determined for each individual employee. RRS is an industry known index for measuring an individual's readiness for retirement at a selected retirement age. RRS can be calculated using currently known industry tools/standards and financial algorithms. The Monte Carlo simulation, for example, can be used to calculate RRS for an individual using input parameters such as, for example, selected retirement age (the Selected Target Retirement Age "STRA"), retirement account balances, rate of salary contributions, income, and information about investments including expected returns on investment and standard deviations on investments. In step 303, the Workforce is grouped into age bands (e.g., by 1-year or 2-year span, or 5-year span, etc.) and, for each age band, an average salary/income and average health care costs are determined. FIG. 4 shows an example of a table containing Workforce data grouped into five-year age bands. FIG. 4 includes the number of employees in each age band, the total healthcare cost for the employees in each age band, the calculated average health care cost for an employee in the age band, and the calculated average income for an employee in the age band.

In step 304 of the method described in FIG. 3, a retirement age band/range (e.g., 62 to 70 years old) is selected on a preferred or a predetermined basis; and in step 305, a New Hire Age Range Parameter (e.g., between the ages of 25 and 50 years old) is selected on a preferred or a predetermined basis. In this exemplary method, there is one new hire for each employee that does retire in order to maintain a constant Workforce headcount. In step 306, the Wage Cost and Health Care Costs ("W+H") are calculated for each:

(a) a retirement age employee (using an average of the costs for all employees in the Workforce at the retirement age band/range selected in step 304), and (b) a new hire employee—an average of the W+H for the end limits of the New Hire Age range selected in step 305.

It is understood that as used herein, the W+H is not limited to solely the wage and health care costs for the employer but rather also could include other direct and indirect costs, such as, workers comp, costs associated with productivity, costs associated with absenteeism, costs associated with detrimental health, etc.

In step 307 of the method described in FIG. 3, the analytical engine calculates the difference between the two costs in W+H determined in step 306 (the "Cost Per Employee Not Retiring"). FIG. 5 shows a table containing an example of the calculated W+H for a retirement age employee and a new hire employee along with the calculated difference (the marginal cost different) between the two. This amount represents the cost of the delay with retirement per employee per year in future years between a new hire and retirement age employee.

In step 308 of the method described in FIG. 3, using the RRSs for the Workforce, the data is grouped (preferably in a distribution table) to create a Retirement Health Index ("RHI") defined by the number of individuals in the Workforce currently/presently within a predetermined range of the RRS (e.g., number of individuals with a RRS between 90 to 100=RHI 100, number of individuals with a RRS between 80 to 89=RHI 90, RSS between 70 and 79=RHI 80, RSS between 60 and 69=RHI 70 and RSS 50 to 59=RHI 60, and RSS less than 60=RHI<60). The RHI depicts whether or not an employee is currently "on track" to reach the retirement income replacement goal of 75% of projected retirement date income. FIG. 6 shows a table containing the results of the RHI index distribution for an example Workforce of 715 employees showing the number by percentage of total Workforce. FIG. 6 shows that of the 715 employees in the Workforce, 26.9% have a RRS greater than or equal to 90, 7.1% have a RRS between 80 and 89, 29.8% have a RRS between 70 and 79, etc.

In step 309 of the method described in FIG. 3, for each RHI value, broken down for each age in the selected retirement age band selected in step 304, the likelihood an employee at that age with that RSS will actually retire at that age is estimated. Accordingly, a table of percentages is created as shown by the example in FIG. 7. The percentages in FIG. 7 represent estimates—the estimated percentage for employees expected to retire at the corresponding age within the RHI value. As shown in FIG. 7, it is estimated that of all of the employees with an RHI of 100, 40 percent at age 62 will retire, 20% at age 63 will retire, 20% at age 64 will retire, and 20% at age 65 will retire.

In step 310 of the method described in FIG. 3, using the RHI distribution for the workforce determined in step 308, multiplied by the Estimated percentage of employees retiring at each age set in step 309, multiplied by the actual headcount for the Workforce at each age within the retirement age band (selected in step 304), the expected number of retirements at each age in the Selected Retirement Age Band is determined. FIG. 8 is a table showing an example of the results for the calculation using the data in FIGS. 6 and 7. FIG. 8 shows, for a single calendar year, the calculated expected number of retirements at each age in the selected retirement age band broken down by RHI value. This calculation is performed for each year in the selected period of time (e.g., 25 years) using the same percentages (FIG. 7) but with the revised headcount data for the year being analyzed.

In step 311 of the method described in FIG. 3, assuming the Workforce number remains constant through a new hire for each retirement, using the RHI distribution from Step 308, for each age in the retirement age band/range selected in step 304, calculating the number of retirees and delayed retirees each calendar year for a specific preset (predetermined) period of time (e.g., 25 years). FIG. 9 shows an example table for one year (e.g., the first year 2015) containing each age in the retirement age band/range selected in Step 4, and for each age, the calculated number of expected retirements and delayed retirements. Using the Cost Per Employee Not Retiring adjusted when necessary for a present value amount using assumed rates, calculating for each age above and below the STRA the savings for those employees expected to retire before the STRA and the costs for those employees retiring after the STRA. For example, as shown in FIG. 9, when the STRA is 65 years old, if 5.9 of the Workforce employees at the age of 66 (6.1 total employees at age 66) are not retiring it will cost the employer $19,893×5.9=$116,453. For the 9.1 employees that are 64 years old, 0.9 will retire saving the employer 0.9×$19,893=$17,018. Thus for one year (2015), the yearly present value liability to the employer for expected retirements between the ages of 62 to 70 years is $253,369. This step is performed for subsequent years for the selected period of time such as, for example, as shown in FIG. 10. The total present value liability ("TPVL") to the employer is the sum of the yearly present value liability for each year in the selected time period as shown in FIG. 10.

In step 312 of the method described in FIG. 3, knowing the TPVL for the selected time period, the retirement health calculator system can model the effects of implementation of one or more of a plurality of measures that impact the RRS for one or more employees to increase the likelihood of retirement at or before the STRA. Thus, the employer can select and implement measures to increase the number of employees in the Workforce retiring at or before the STRA which reduces the TPVL to the employer. Effectively, then, the employer is selecting Plans and taking action based on the net decrease in the calculated TPVL according to the modified Plan. As shown in step 313 of the method described in FIG. 3, the process is therefore repetitive from step 302 (or in some cases step 301) to determine the net effect on changes to input parameters.

The one or more of a plurality of measures that impact the RRS (making them more ready to retire at a preselected age) include but are not limited to: (a) Modification of employee retirement account balances through use of at least one of Auto-enrollment for employee retirement contributions, auto-increase of employee retirement contributions, and restructuring of match contribution plans to achieve greater net contributions; (b) Modification of investment selections to reduce risk of investment and/or increase return rate (that is, optimize outcomes); and/or (c) Examination of an employee's personal finances, liabilities, and savings plans and strategies and implementing changes to improve that employee's financial wellness outside his/her retirement plan(s).

More specific examples include but are not limited to; the stretching of the employer contribution match, for example from 100% on 4.0% of income to 50% on 8.0% of income. Another would be to automatically enroll all employees in the plan not just new hires. Third would be to increase plan assets by implementing an annual automatic deferral increase program to a capped level. An example on the investment level controls is to ensure the optimal weighting for participant Dynamic Risk Model, and apply an industry best practice matrix to optimize outcomes. Every area that adds to the liability gives an opportunity to address improvement in liability expense for the employer while creating financial wellness for the employee.

For example, as shown in FIG. 11, when the overall RHI for the entire Workforce is improved from 57% to 79%, the TPVL over 25 years decreases $3,255,149 representing a substantial decrease in liability for the employer more than justifying the expense for the measures implemented to achieve the increase in overall Workforce RHI.

The goal would be to continually apply additional prescriptive solutions to ultimately reach the employer level goal of all employees at a 100 retirement health index by age 65. The employer goal is to reduce the TPVL to $0 by implementing solutions that maximize the benefit per dollar for both the employee and employer. At the point the perfect alignment of employer and employee benefits has been achieved.

The viability report is affected by several lever adjustments, including one or more of the following: the client retirement plan option, client healthcare cost options, system calculation parameters, employee demographic data, workers compensation data, and employee turnover data.

The client retirement plan options include at least one or more of the following: percentage of employer match, limits of employer match as a percentage or in absolute amounts, a percentage of non-discretionary employer contribution, pre-existing defined benefits payments, other retirement accumulation vehicles, percentage of automatic enrollment among employees, percentage of automatic enrollment of new employees, percentage of automatic enrollment among all employees, automatic increase in retirement contributions per year, and automatic increase in retirement contributions as a percentage or in absolute amounts.

The client healthcare cost options include at least one or more of the following: whether it is modeled healthcare, the modeled healthcare state(s), data regarding fully insured employee only premium by age, self-insured employee only claims by employee, self-insured administrative cost %, and self-insured annual large claim cost premium. System calculation parameters include one or more of the following: annual cost of capital %, annual health care inflation %, annual wage inflation %, age range for new hire employee, age range for retirement age employee, annual separation rate by age, 100% readiness age, and 100% readiness percentage of replacement income. The employee demographic data includes at least one or more of the following: date of birth, date of hire, annual income, retirement plan account balance, deferral %, and gender. The workers' compensation data include data classified by state and zip code, industry code, and the payroll premium factor. One can also factor in client specific parameters, such as turnover data including a percentage of annual turnover and the unexpected percentage of turnover.

The retirement health calculator system can be integrate or lead into other systems such as an employer's financial reporting systems providing current and future corporate liabilities, employer's human resource systems introducing future workforce demographic changes, or advisory firm systems to quantify/support fee impact and retention analysis.

An embodiment of the methods disclosed herein includes acquiring information from an employer's database containing data records of its workforce and calculating a retirement readiness score for each individual for a preselected/predetermined retirement age (e.g., 65). The method then includes selecting an age band for employee retirement, selecting an age band for new hires to replace retiring employees, and determining the difference in cost to the employer for keeping an employee that does not retire instead of an average new hire, for each year in a predetermined period of time or the plan time period (e.g., 25 years). The method further includes calculating the present value cost to the employer for employees in the age band for employee retirement (either a cost if they retire after the preselected retirement age or a savings if they retire before the preselected retirement age) and determining the total present value of the cost to the employer for the predetermined period of time. The method includes presenting on a user device a selection of plans offered or considered by an employer, such as its employee health care plans, retirement plans, and/or benefits packages, that can increase the likelihood employees retire at the predetermined retirement age (thus an increase in the retirement readiness score) based on the calculated reduction in the total present value cost to the employer. By increasing the number of employees ready to retire at the predetermined retirement age, the employer saves in costs for health care, salary/income, and retirement contributions, etc., due to the lesser costs for younger new hires. Methods disclosed herein allow for and include the selection of plans based on the calculated long term savings to the employer, viewed as a total present value amount, resulting from employees having a greater likelihood of retiring at a predetermined retirement age. Methods disclosed herein are novel processes to analyze and quantify the cost to the employer arising from employees being unable to retire in the future. These methods generate clear quantification models of the financial burden to the employer caused by its employees working past a predetermined retirement age due to financial instability. When the cost is re-calculated with changes to increase the likelihood employees retire timely, the net present value savings to the employer is determined and realized. The process employers use to select benefits plans is improved and the end result, namely the plan(s) selected, are different than without use of the process of the methods because employers can now appreciate the savings obtained by selecting plans more beneficial to the employees even if those plans cost the employer more than the plan initially selected.

Reports and models generated using methods disclosed herein allow financial officers of organizations to better understand the integrated age-related cost of their current and future workforce. Methods described herein also provide prescriptive solutions to mitigate escalating costs by improving employee financial health.

In an embodiment, the method of presenting graphical user interfaces that display the total present value liability or cost to an employer include the steps of:

(1) acquiring from an employer database a plurality of data records about its current workforce;

(2) calculating using a retirement health calculator a retirement readiness score ("RRS") for each employee at a selected retirement age (e.g., 65 years old);

(3) grouping employees into age bands and determining average income and average health care costs for an employee in each age band;

(4) using a selected retirement age range (e.g., 62 to 70 years old) and a selected age range for new hires (e.g., 25 to 50 years old); (a new hire is assumed to be added to the workforce for each employee that retires to maintain a constant workforce number), and calculating the difference in the average cost for wage and the average cost for health care (collectively, the wage and health care costs ("WHC")) between a retiring employee and a new hire—the Yearly Cost to the Employer For an Employee Unable to Retire ("Cost Per Employee Not Retiring");

(5) forecasting, for each year in a selected period of time (e.g., 25 years), for each age in a selected age band (e.g., 62 to 70):

(a) the number of employees that retire; and (b) the number of employees that are unable to retire;

and using a selected target retirement age ("STRA")—the same one utilized in the calculation of the RRS—(e.g., 65 years old), calculating the net yearly present value cost to the employer for:

(a) the employees unable to retire at the STRA; and (b) the employees able to retire before the STRA (a savings to the employer);

(6) calculating (summing) the total present value liability/cost to the employer ("TPVL") over the selected period of time used in the prior step; and (7) selecting, changing, adding and/or dropping Plans and/or working with employees individually based on the resulting change to the TPVL—changes that increase the RRS for at least one employee thereby reducing the TPVL for the employer.

Data records in the employer's database contain information about its current workforce, including but not limited to for each employee, age (date of birth), gender, wage (salary/income), retirement account balances, employee salary contribution amounts to retirement accounts, health care cost and claim information (costs for claims and costs for premiums), salary deferral amounts and rates, employer percentage salary match rates for retirement plans, caps rates, and stock option plans, and amounts for retirement plan contributions.

The retirement readiness score estimates the probability an employee retiring at a selected age (e.g., 65) will successfully fund their retirement needs to life expectancy, using standard target levels of income, inflation and investment returns and risks over the plan forecast period. In some embodiments, the analytical engine calculates the retirement readiness score for each employee using known industry tools and standards, such as, for example, the Monte Carlo simulation. Of course, it is understood that an RRS can vary depending upon the selection of one or more variables utilized in the simulation, which include but are not limited to the selected retirement age, return on investment rates, inflation rates, and income amounts.

Certain embodiments may include methods of analyzing various TPVL models by selecting, changing, adding and/or dropping Plans, including but not limited to, adding plans with auto-enrollment for retirement contributions, adding plans with auto-increase of employee retirement contributions, adding plans with different match contribution ratios for greater net contributions, adding plans with different investment strategies, and/or working with employees individually based on the resulting change to the TPVL.

Certain embodiments may include methods of determining the current and future costs to the employer for its employees on an age related or on an age banded basis. The method determines the future costs for those employees that do not retire at the STRA, the savings for those employees that do retire before the STRA, and the corresponding TPVL to the employer. Methods also include the selection, changing, adding and/or dropping of Plans based on the changes to the TPVL when calculated with the modified Plan specification(s). This results in an optimized alignment of financial resources to maximize employee financial benefits and employer viability. A financially well-off older employee/worker has the choice to be a highly valued fully engaged employee or to leave employment. An employee/worker not financially on track may be disengaged and bring additional expense and risk to an employer.

FIG. 12 is a table of data records acquired by an analytical engine from an employer database that contains current and historical employee demographic information, such as age, wage costs, and healthcare costs are introduced into the retirement health calculator system. Using these data records, the analytical engine sorts the employee data by age bands and calculates the employee cost variance by age band, as shown, for example in FIG. 13. Based on these data records, the system then calculates the marginal cost of delay, which is defined as the cost per employee, per year in future years between a new hire and retirement age employee, as shown, for example in FIG. 14.

Next, retirement plan detail information including employee contribution rates, account balances and employer match rates are introduced into the retirement health calculator system, as shown, for example in FIG. 15. Using industry standard retirement readiness calculations, the retirement health calculator system creates a Retirement Health Index per employee. The RHI depicts whether or not the employee is currently "on track" to reach the retirement income replacement goal of 75% of projected retirement date income. From the employee level analysis aggregate to the employer level, a workforce distribution is provided sorted by retirement health index and age band. Using this data, weighted by the actual age census, one can define the company plan level health by retirement health index, as shown, for example in FIG. 16.

Based upon current retirement health inputs, the retirement health calculator system generates a forecast of the Retirement Health Indices for retirement age employees (age 62-70) using Monte Carlo simulation methods. The simulation takes the average of a series of forecasted health scores resulting from draws utilizing current retirement allocation, and mean return and variance estimates from simulated benchmark standard portfolios, and applies the employee retirement health information to the proprietary matrix of expected retirement age per retirement health index, as shown, for example in FIG. 16. Based on the plan retirement health index distribution, the retirement health calculator system forecasts the expected retirement rate for every employee retirement age, as shown, for example in FIG. 17. This forecast calculation is based upon statistical research linking retirement health to retirement age. This analysis results in a proprietary matrix of age and retirement index that predicts retirement age.

The retirement health calculator system then acquires new hire data records, from employer or external databases or derived by modeling, for average new hire age ranges, average retiree age ranges, healthcare inflation, wage cost inflation, workforce size estimates and for all type separations, voluntary, involuntary or by death, as shown, for example in FIG. 18. The retirement health calculator system then applies the separation rates acquired from employer or external databases data or derived by modeling, as shown, for example in FIG. 19 to the current workforce to forecast future workforce for all age bands younger than retirement age. Thus, a size and age distribution is generated for all non-retirement age employees in future years.

Utilizing the previously calculated expected retirement age data and the forecasted workforce demographic information, the retirement health calculator system calculates the retirement age (62-70 or client defined) in future years. The system then prepares an estimate of the retirement age employees that will delay retirement using the current RHI, as shown, for example in FIG. 20. The system then determines the number of new hires annually based upon the workforce size assumption data, either client provided or modeled or obtained from external databases, and generates an annual total workforce forecast by age band blending employee retention, retirements and new hires, as shown, for example in FIG. 21.

By utilizing the marginal difference in employee costs in FIG. 13 as a time vector (costs per year in the future) and the workforce vector (workforce in the future) contingent on the plan Retirement Health Index, the retirement health calculator system will compute the employer's total dynamic liability for future years, defined as the annual sum of all employee marginal cost, as shown, for example in FIG. 22. The retirement health calculator system then incorporates the cost of capital data to compute the present value company costs for future dynamic liabilities, as shown, for example in FIG. 23. The Reveal Viability Program provides results in a consistent definable framework to analyze the economic value of solutions to retirement health. At this point the system has detailed the future cost ramifications to the employer of the aging workforce. It has also identified at the individual level the retirement health issues that must be mitigated to bring the employee back to "good financial health" which address the employer dynamic liability.

Certain embodiments of the retirement health calculator system include a prescriptive solutions module at both the plan and individual level. Similar to defined benefit plans, two of the most powerful levers for improving the funded status are contributions and investments. Several but not all of the prescriptive plan level changes are around funding structures, not simply funding levels. Examples include but are not limited to; the stretching of the employer contribution match, for example from 100% on 4% of income to 50% on 10% of income. Another example would be to automatically enroll all employees in the plan, not just new hires. Another example would be to increase plan assets by implementing an annual auto deferral increase program to a capped level. An example on the investment lever controls is to ensure the optimal weighting for participant Dynamic Risk Model, and apply an industry best practice matrix to optimize outcomes at both the employer plan and employee levels. An example to optimize retirement health outcomes would involve utilizing an outcomes-based approach at the advisor and provider levels to drive effective decisions. Other examples include introducing customized outcomes based investment best practices to maximize the reliability of successful outcomes, instituting funding strategies relative to the returns on investment and improved certainty of outcomes, creating benchmarks of outcome based improvements and the cost metrics (actual vs. estimated) using a Dynamic Liability Management Program. Thus, the retirement health calculator system can achieve cross benefit optimization of financial health for employees and their families.

Applying the prescriptive solutions module, using the employee data records, the improved Retirement Heath Index is determined. Once the improved Retirement Health Indices are determined, the retirement health calculator system can rerun to quantify the improvements in employee's expected retirement age and the employer level Dynamic Liability and compare them to original data. For example, compare FIG. 16 and FIG. 20 versus FIG. 24 and also FIG. 22 versus FIG. 25.

The retirement health calculator system can communicate with an associated database to store all input and outputs for each time the processes have been executed. This allows for quantitative comparison from year to year and the ability to evaluate the impact of the prescriptive solutions employed. Client estimated parameters, such as separation rates, retirement age, new hire age, healthcare inflation, etc, become reflective of specific client experience as the actual parameters can be calculated.

EXAMPLE

The following example is based upon an actual company that currently has a workforce of 11,536 employees. Their actual input information has been used without information regarding identity to protect both employer and employee privacy. All other data is actual data, and will be used to go through the processes described in the Detailed Description and may demonstrate possible real-life results.

The client employee data including dates of birth, annual wage information and individual annual healthcare premiums. The system created an age banded analysis of employee cost only including healthcare and wage cost. Other employee costs such as worker compensation, life/disability insurance costs or other employee costs were not included. Therefore the total cost per employee were not complete so projected savings are somewhat understated. The costs that were provided will be adequate to fully demonstrate the value of the any number of embodiments. Finally the marginal cost of delay was calculated ($74,428−35,315=$35,315) defined as the cost per employee per year in the future between a new hire and retirement age employee.

Next the retirement plan information was introduced that included actual employee data based on contribution rates and account balances. The employer match rate for the plan was 100% of the employee's first 4%. An industry standard retirement readiness calculator was used to determine the retirement health index by employee. The company average retirement health index was 49 on a scale of 0-100, as shown in FIG. 26. The system then calculated the Plan Health Report which provided a workforce average retirement health index by age band. Based upon current retirement health inputs, the average retirement health indices for retirement age employees (age 62-70) were calculated using Monte Carlo simulation methods. It was determined that there were currently 1,529 employees with expected retirement age band, as shown in FIG. 27.

The balance of the client level data on separation rates, new hire age range, average retiree age range, healthcare inflation and wage inflation were introduced. This data was processed to provide the age banded future workforce makeup, as shown in FIG. 21.

Using the previously calculated expected retirement age and the workforce, the retirement health calculator system calculates the retirement age employees in future years, as shown in FIG. 26. By using the marginal cost difference in employee costs the present and future dynamic liabilities cost. In this example the 2015 annual dynamic liability was $12,670,418 and was forecasted to rise to $25,290,000 annually without prescriptive solutions, as shown in FIG. 26.

After the prescriptive solutions were applied, the Reveal system processes were rerun to calculate the improved results which were as follows:

(1) Average retirement index score improved from 49 to 68, as shown in FIG. 28.

(2) Average expected retirement age improved from 67.87 to 66.40

(3) Employer Dynamic 2015 Dynamic Liability improved from $12,670,418 to $3,473,384, as shown in FIG. 29.

Certain embodiments of the method can include continual application of additional prescriptive solutions to ultimately reach the employee level goal of all employees at a 100 retirement health index by age 65. The employer goal is to reduce the annual dynamic liability to $0. At the point, a perfect alignment of employer and employee benefits would have been achieved.

While the subject matter disclosed herein has been illustrated by description of various embodiments and while those embodiments have been described in considerable detail, it is not the intention of applicant to restrict or in any way limit the scope of the appended claims to such details. Additional advantages and modifications will readily appear to those skilled in the art. The subject matter disclosed herein in its broader aspects is therefore not limited to the specific details and illustrative examples shown and described. Accordingly, departures may be made from such details without departing from the spirit or scope of the disclosed subject matter.

What is claimed is:

1. A computer-implemented method for generating a graphical user interface on a client device, the method comprising:

receiving, by a first processor of a server comprising at least two processors, from the graphical user interface displayed on the client device, a plurality of values corresponding to a plurality of parameters affecting a retirement plan for a plurality of users, wherein the plurality of parameters include a retirement savings option, a healthcare plan option, a target retirement age, a retirement age range, and a replacement age range;

querying, by the first processor, an employment database containing a first plurality of data records to identify a second plurality of data records in response to the values for the retirement age range for the plurality of users and a third plurality of data records in response to the values for the replacement age range for the plurality of users;

iteratively revising, by the first processor, the retirement plan for the plurality of users to increase a likelihood that the plurality of users retire at the target retirement age, the first processor executing in parallel with a second processor, wherein with each iteration performed by the first processor, the second processor:

executes a first algorithm utilizing a Monte Carlo simulation protocol on a first annual cost value determined based on the second plurality of data records and a second annual cost value determined based on the third plurality of data records to determine an annual present value liability for the plurality of users; and executes a second algorithm using the annual present value liability generated for each respective year in a predetermined period of time to calculate a total present value liability of the retirement plan for the plurality of users for the predetermined period of time, wherein the first processor iteratively revises the retirement plan until the annual present value liability satisfies a threshold; and generating, by the first processor, a new graphical user interface configured to display on the client device a final retirement plan for the plurality of users.

2. The computer-implemented method according to claim 1, wherein the target retirement age is 65 years old.

3. The computer-implemented method according to claim 1, wherein the first annual cost value is determined by averaging wage values and healthcare cost values from the second plurality of data records.

4. The computer-implemented method according to claim 1, wherein the second annual cost value is determined by averaging wage values and healthcare cost values from the third plurality of data records.

5. The computer-implemented method according to claim 3, wherein said wage and healthcare costs comprises one or more of the following: annual wages, healthcare premiums, workers compensation expenses, costs associated with productivity, costs associated with absenteeism, and costs associated with detrimental health.

6. The computer-implemented method according to claim 1, wherein the predetermined period of time is twenty-five years.

7. A system comprising:

at least two processors;

an employment database communicatively coupled to the at least two processors; and a non-transitory computer-readable storage medium having instructions stored therein, which when executed by the at least two processors, cause a first processor of the at least two processors to:

receive from a client device a plurality of values corresponding to a plurality of parameters affecting a retirement plan for a plurality of users, wherein the plurality of parameters include a retirement savings option, a healthcare plan option, a target retirement age, a retirement age range, and a replacement age range;

query the employment database containing a first plurality of data records to identify a second plurality of data records in response to the values for the retirement age range and a third plurality of data records in response to the values for the replacement age range;

iteratively revise the retirement plan for the plurality of users to increase a likelihood that the plurality of users retire at the target retirement age by:

a second processor configured to:

execute a first algorithm utilizing a Monte carlo simulation protocol on a first annual cost value determined based on the second plurality of data records and a second annual cost value determined based on the third plurality of data records to determine an annual present value liability for the plurality of users, execute a second algorithm using the annual present value liability generated for each respective year in a predetermined period of time to calculate a total present value liability of the retirement plan for the plurality of users for the predetermined period of time, wherein the first processor iteratively revises the retirement plan until the annual present value liability satisfies a threshold; and generate and transmit to the client device a graphical user interface displaying a final retirement plan for the plurality of users.

8. The system of claim 7, wherein the first annual cost value is determined by averaging wage values and healthcare cost values from the second plurality of data records.

9. The system of claim 7, wherein the second annual cost value is determined by averaging wage values and healthcare cost values from the third plurality of data records.

10. The system of claim 8, wherein said wage and healthcare costs comprises one or more of the following: annual wages, healthcare premiums, workers compensation expenses, costs associated with productivity, costs associated with absenteeism, and costs associated with detrimental health.

11. The system of claim 7, wherein the predetermined period of time is twenty-five years.

* * * * *